(12) United States Patent
Dawson (10) Patent No.: US 10,902,553 B2
(45) Date of Patent: Jan. 26, 2021

(54) METHOD AND APPARATUS FOR GENERATING AN ENHANCED DIGITAL IMAGE OF A PHYSICAL OBJECT OR ENVIRONMENT

(71) Applicant: THE SECRETARY OF STATE FOR DEFENCE, Salisbury (GB)

(72) Inventor: John Edward Dawson, Salisbury (GB)

(73) Assignee: The Secretary of State for Defence, Salisbury (GB)

(*) Notice: Subject to any disclaimer, the term of this patent is extended or adjusted under 35 U.S.C. 154(b) by 215 days.

(21) Appl. No.: 16/319,521

(22) PCT Filed: Aug. 4, 2017

(86) PCT No.: PCT/GB2017/000120
§ 371 (c)(1),
(2) Date: Jan. 22, 2019

(87) PCT Pub. No.: WO2018/025006
PCT Pub. Date: Feb. 8, 2018

(65) Prior Publication Data
US 2020/0380636 A1  Dec. 3, 2020

(30) Foreign Application Priority Data
Aug. 5, 2016 (GB) .................................. 1613556.8

(51) Int. Cl.
*G06T 3/00* (2006.01)
*G06T 7/32* (2017.01)

(52) U.S. Cl.
CPC .......... *G06T 3/0075* (2013.01); *G06T 3/0056* (2013.01); *G06T 7/32* (2017.01);
(Continued)

(58) Field of Classification Search
USPC .......................................... 382/276, 294–296
See application file for complete search history.

(56) References Cited

U.S. PATENT DOCUMENTS

| 6,343,143 B1 * | 1/2002 | Guillemaud .......... G06T 3/0068 |
| | | 382/130 |
| 6,373,970 B1 * | 4/2002 | Dong ........................ G06K 9/32 |
| | | 128/922 |

(Continued)

FOREIGN PATENT DOCUMENTS

| CN | 101504766 A | 8/2009 |
| CN | 102800074 A | 11/2012 |

(Continued)

OTHER PUBLICATIONS

United Kingdom Patent Application No. GB1613556.8, Search Report dated Jan. 27, 2017, 4 pages.

(Continued)

*Primary Examiner* — Ishrat I Sherali
(74) *Attorney, Agent, or Firm* — Dean W. Russell; Kilpatrick Townsend & Stockton LLP (57) ABSTRACT

A method and apparatus are provided for generating enhanced digital imagery from digital input images (7) exhibiting differences other than or in excess of differences in projection. By applying a plurality of image transformations (10) to frequency normalised (8) versions of the input images, and generating measures of image similarity (11) therefrom, an optimum image transformation (12) can be determined that can be applied to the digital input images such that they are substantially matched. Digital input images of physical objects or environments to which the method is applied can then be used in image fusion, ortho-rectification or change detection applications, in order to monitor the physical object or environment.

15 Claims, 4 Drawing Sheets

(52) U.S. Cl.
CPC ............... *G06T 2207/10032* (2013.01); *G06T 2207/30181* (2013.01)

(56) References Cited

U.S. PATENT DOCUMENTS

| | | | |
|---|---|---|---|
| 7,400,783 B2* | 7/2008 | Sheu | G06K 9/3216 345/648 |
| 7,853,098 B2* | 12/2010 | Hardy | G06T 7/32 382/294 |
| 9,161,686 B2* | 10/2015 | Yonezawa | G06T 7/0012 |
| 2004/0179738 A1* | 9/2004 | Dai | G06T 7/0002 382/218 |
| 2005/0111738 A1* | 5/2005 | Iizuka | G06K 9/6232 382/190 |
| 2007/0122060 A1 | 5/2007 | Hardy et al. | |
| 2007/0188715 A1 | 8/2007 | Inazumi | |
| 2019/0206070 A1* | 7/2019 | Nash | G06T 7/37 |
| 2020/0226413 A1* | 7/2020 | Ye | G06K 9/6215 |

FOREIGN PATENT DOCUMENTS

| CN | 103325105 A | 9/2013 |
|---|---|---|
| EP | 1657679 A1 | 5/2006 |

OTHER PUBLICATIONS

International Patent Application No. PCT/GB2017/000120, International Search Report and Written Opinion dated Oct. 13, 2017, 12 pages.
United Kingdom Patent Application No. GB1712425.6, Combined and Examination Report dated Jan. 31, 2018, 7 pages.
Coulter, Lloyd L., et al., "Assessment of the Spatial Co-registration of Multitemporal Imagery from Large Format Digital Cameras in the Context of Detailed Change Detection," Sensors, 2008, pp. 2161-2173, vol. 8, MDPI (http://www.mdpi.org).
International Patent Application No. PCT/GB2017/000120, International Preliminary Report on Patentability dated Feb. 14, 2019, 8 pages.
United Kingdom Patent Application No. GB1712425.6, Combined Search and Examination Report dated Jan. 31, 2018, 7 pages.
United Kingdom Patent Application No. GB1712425.6, Intention to Grant dated Feb. 21, 2019, 2 pages.
United Kingdom Patent Application No. GB1712425.6, Notification of Grant dated Apr. 9, 2019, 2 pages.

* cited by examiner

METHOD AND APPARATUS FOR GENERATING AN ENHANCED DIGITAL IMAGE OF A PHYSICAL OBJECT OR ENVIRONMENT

The present invention relates to monitoring of a physical object or environment. In particular, the invention relates to the provision of digital imagery that is enhanced such that it is suitable for monitoring a physical object or environment.

A generally understood technique for monitoring changes to a physical object or environment involves recording an image and comparing it to an image known to be of the physical object or environment, the base image. The base image can be compared to a plurality of new images in an effort to detect changes to the known object or environment. The new image(s) may differ from the base image by a projective transformation owing to the different imaging perspectives, but in many cases this misalignment may be approximated by a rotation, scale and offset. The new images may have been obtained at different times with changes occurring to the physical object or environment in the interim period. A further technique for monitoring a physical object or environment involves recording multiple images each obtained using a different type of sensor. The images may then be compared or fused to provide additional information regarding an object or environment. Whatever technique is used, a key step in the imagery comparison or fusion process is to first try and determine differences in projection and thus the image transformation (for example rotation, scale and offset factors) necessary to map the base and new image(s) onto each other. This may include deriving a score of how similar the images are. This process is known as image registration.

Mapping two images onto each other can be performed by manually adjusting, for example, the orientation, scale and position of two physical or digital images, then comparing the features within the adjusted images by eye. This approach is impractical for large quantities of images or where the images are relatively complex. To overcome these issues, automated image registration may be used. Tools have been developed to resize, reorient and translate images onto each other, enabling image similarity to be measured. A well understood approach is to use image correlation.

Digital image correlation (or cross-correlation) is an example of a basic image comparison operation that can be used to determine the offset between two digital images within an image registration process. Given two equally sized images, cross-correlation produces a correlation image such that each pixel in the correlation image is the total pixel-wise product of the first input image and the second input image shifted such that the origin is at that pixel location. In practical applications the correlation image is generally computed using Fourier Transform methods. As an example, for two arrays representing respective first and second digital images of the same physical object, that are offset from each other, the steps involved in obtaining a correlation image comprise: applying a Fourier Transform to each array to obtain respective first and second phase space representations of the digital images; multiplying element-wise the first phase space representation by the complex conjugate of the second phase space representation to obtain the cross power spectrum; applying an inverse Fourier Transform to the cross power spectrum to obtain the correlation image. The coordinates of the maximum value in the correlation image represents the linear shift that maximises the total pixel-wise product between the images and should map the two original digital images onto each other.

Cross-correlation will return a linear shift between two input images. In situations where the input images are misaligned by more than a linear shift—for example owing to different scaling or rotation—other image transformations can be applied iteratively with the cross-correlation repeated for each iteration. As examples the rotation angle, scale factor and linear offset that maximises the image correlation (and should correspond to actual alignment) may thus be found. However in many real world applications, this technique can fail to align the images because changes in illumination, scene content, image noise and other differences between the images cause the correlation peak to not correspond to true image alignment. A simple illustration of this is to compare an image with its negative. In that case the true alignment (zero rotation, unit scale factor and zero linear shift) would correspond to a minimum value in the correlation image.

Phase-correlation is an improved image comparison operation often applied to images. The method is closely related to cross-correlation, however the magnitudes of the complex values in the cross power spectrum are normalised to all have unit magnitude. As with cross-correlation, the inverse Fourier transform of this normalised cross-power spectrum returns a correlation image, where the position of the peak value corresponds to the linear offset between the images and the magnitude of this peak is a measure of similarity between the two correlated images. The advantage of phase-correlation over cross-correlation is that it is much more robust to differences between the images and so the peak location will correspond to the true offset in image comparisons where cross-correlation may fail.

Phase-correlation may also be used to iteratively recover rotation and scale differences as well as linear offsets. However, the disadvantage of phase-correlation is that the phase-correlation peak can fluctuate strongly in magnitude when adjustments are made to the size or orientation of one of the images (unlike cross-correlation which varies gradually with slight change to the input images). This makes an iterative search for the optimum rotation and scale challenging, as the phase-correlation magnitude does not approach its maximum smoothly as the rotation and scale factors approach their true values. This effect is most significant with images wherein the physical object or environment has undergone a substantial change between images, or where other intrinsic properties of the image are different and can lead to incorrect identification of optimum image adjustments and therefore incorrect measures of image similarity. The impact of this can be reduced by finely incrementing the size or rotation of one of the images however this is inefficient and computationally intensive as it requires the evaluation of phase-correlation at many potential scales and orientations.

Therefore it is an object of the present invention to provide a method and apparatus for generating enhanced digital imagery suitable for monitoring a physical object or environment, wherein the method and apparatus use digital input images that exhibit differences other than or in excess of, differences in projection.

According to a first aspect of the invention there is provided, a method of generating an enhanced digital image of a physical object or environment, the method, comprising the steps of:

provided first and second images of a physical object or environment as digital input images, the first and second digital input images exhibiting differences other than or in excess of differences in projection;

applying a plurality of image transformations to at least one of the digital input images, and for each image transformation applying an image comparison operation to determine a measure of image similarity;

determining an optimum image transformation corresponding to an optimum value for the measure of image similarity; and applying the optimum image transformation to the at least one of the digital input images so as to generate at least one enhanced digital image that is substantially matched to the other digital input image;

characterised in that the step of applying a plurality of image transformations and determining in each case a measure of image similarity, comprises:

converting both digital input images to frequency normalised digital images; and applying the plurality of image transformations to at least one of the frequency normalised digital images, and for each of the plurality of image transformations:

applying an image comparison operation to the frequency normalised digital images and generating the measure of image similarity therefrom.

According to a second aspect to the invention there is provided, apparatus of generating an enhanced digital image of a physical object or environment, wherein the apparatus comprises at least one computer configured to:

provide first and second images of a physical object or environment as digital input images, the first and second digital input images exhibiting differences other than or in excess of differences in projection;

apply a plurality of image transformations to at least one of the digital input images, and for each image transformation apply an image comparison operation to determine a measure of image similarity;

determine an optimum image transformation corresponding to an optimum value for the measure of image similarity; and apply the optimum image transformation to the at least one of the digital input images so as to generate at least one enhanced digital image that is substantially matched to the other digital input image;

characterised in that the at least one computer is configured, in applying a plurality of image transformations and determining in each case a measure of image similarity, to:

convert both digital input images to frequency normalised digital images; and apply the plurality of image transformations to at least one of the frequency normalised digital images, and for each of the plurality of, image transformations, to:

apply an image comparison operation to the frequency normalised digital images and generate the measure of image similarity therefrom.

A physical object or environment may be as an example, but is not limited to, a group of stars or a galaxy, a natural or urban landscape, a body part or body feature or, as a further example, bacteria growing in a petri dish. In one embodiment of the invention the images are of a region of the Earth (for instance terrain) such as may be provided by sensors mounted on aircraft, which may operate at visible wavelengths. These vehicles may operate substantially overhead of the landscape to be imaged, or may operate at other viewing orientations. In another embodiment of the invention the images are from astrophotography and feature groups of stars, each image taken on different occasions. One further embodiment uses images from magnetic resonance imaging (MRI) that may be deformed relative to one another owing to patient motion. Further applications of image comparison or registration will be apparent to a person skilled in the art.

The term 'digital image' is used to encompass any image represented in digital form. Such an image may be provided as a raw image or processed image previously generated by a sensor, for example aboard an aircraft or upon a microscope. In accordance with the invention, first and second images are provided as digital input images which may be provided as electrical signals stored within a computer system. Many images may be provided in the computer system from which the two images are selected. Images may be stored in computer memory. The storage may be such that images can be accessed, modified and overwritten. The computer system may be a general purpose computer capable of running a computer program comprising an algorithm executing the method described herein. In some embodiments of the invention the first and second digital input images may be recorded using at least one sensor. The sensor may be a camera mounted on an aircraft recording digital photographs on the Earth.

A 'frequency normalised digital image' is an image created by applying a Fourier Transform function or substantially equivalent function to a digital image (which may be a digital input image) to produce a phase space representation of the image; normalising all or substantially all of the elements in the phase space representation, which typically are complex values; and applying an inverse to the Fourier Transform or the substantially equivalent function, to the normalised phase space representation.

An enhanced digital image is understood to be an image, or fusion of images, that has added quality, information or value, as a result of a digital process. An enhanced digital image may be an image that has undergone image registration relative to a second image, so as to allow further processing which may include fusion with other imagery or change detection. An enhanced digital image may also be an image resulting from the digital combination of two images. Furthermore, in some embodiments of the invention, at least one of the digital input images may already be an enhanced digital image. An example is where the first digital input image is an orthorectified terrain image, the second digital input image is a non-orthorectified terrain image, and the optimum image transformation is applied to the second digital input image so as to provide it as an orthorectified digital image.

An image transformation may be mathematically defined as a rotation, scaling or combination thereof. Other image transformations such as various distortions will be apparent to a person skilled in the art.

In some embodiments of the invention, image transformations are applied to at least one frequency normalised digital image in accordance with at least one pre-set parameter stored in a computer system. The pre-set parameters may be stored within an array of parameters available in memory in the computer system. Alternatively a single image transformation parameter may be incremented iteratively.

Embodiments of the invention use a plurality of digital input images that feature differences other than, or in excess of, differences in projection. Differences in projection between two images are generally caused by different imaging perspectives of the sensor obtaining the images. Differences in projection may be approximated in imagery by different scaling, rotation, translation, or combination thereof. Differences in excess of this may comprise a difference in the properties of the images as a result of the sensor used in the imaging process, or as a result of differences in the conditions under which the images were obtained. Differences as a result of the sensor used include, but are not limited to, noise, blur, dead pixels, field of view and waveband of radiation imaged. Conditions under which the images were obtained include, but are not limited to, different dates upon which the images were obtained (resulting in additional features between images) and different illumination conditions. A difference between two images may also imply two images that feature many differences between them. Standard cross-correlation and phase-correlation have been shown by the inventor to struggle to efficiently determine the misalignment when the images are compounded with differences in this way.

In embodiments of the invention, prior to performing image comparison of two digital images, the digital input images are converted to respective frequency normalised digital images. Image transformations are then applied to the frequency normalised digital images, from which image similarity may be measured. Embodiments of the invention may apply the image transformations and measurements of image similarity in an iterative manner or alternatively in parallel.

In embodiments of the invention, the image comparison is a correlation, preferably a cross-correlation. For embodiments where the image comparison is a correlation, the measure of image similarity may be a correlation score represented by the magnitude of the peak in the correlation image produced as a result of applying, for instance, a cross-correlation. The larger the magnitude of the correlation score, the stronger the match is between the two images. In other embodiments the measure is the area or volume of the peak in the correlation map, calculated by reference to a predetermined peak width or calculation for determining peak width.

For each image transformation a correlation output may be obtained as the measure of image similarity, which may be a correlation score. Each correlation score may be stored in, for example, an array within a computer system, such that a plurality of correlations outputs are stored. A sorting function may be applied to the plurality of correlations outputs to identify a peak or maximum value. Alternatively a single correlation score may be stored in the computer system and updated in an iterative manner if the latest correlation score is greater than that already stored.

An optimum value for the measure of image similarity may be the maximum score obtained from a plurality of correlation scores. In an embodiment of the invention each correlation score represents the similarity between two images following, for instance, an image rotation. The optimum image transformation may then be a rotation associated with that maximum correlation score.

A window function may be applied to at least one of the digital images in preferred embodiments of the invention. This may be implemented to minimise unwanted effects during the frequency normalisation process. The window function may be a Tukey window or other windowing function. The window function may be applied to at least one of the digital images, but usually both.

A frequency filter may be applied to at least one of the digital images. A frequency filter is generally applied to phase space representations of digital images. This may be implemented in embodiments of the invention so as to limit the effect of those values of the phase space representations that correspond to spatial frequencies that correspond to variation between neighbouring pixels of one or both of the digital images. The frequency filter may be a Butterworth filter.

The inventor has shown that in at, least one embodiment of the invention (particularly one including cross-correlation as the image comparison operation, including the Tukey window and Butterworth filter, and using images based on aerial imagery of terrain), the correlation scores vary substantially smoothly through a true maximum value with successive iterations of the image transformations, thus determining the optimum value for the measure of image similarity and the respective optimum image transformation in a relatively efficient and reliable manner.

Digital image fusion is generally understood to be the process of combining information from two or more digital images into a single enhanced digital image. Enhanced digital images are generally more informative than any of the input images and as such have improved value. Embodiments of the invention may combine at least two digital images so as to generate an enhanced digital image, such that the enhanced digital image comprises features from each of the digital images. In an embodiment the digital images from which the substantially matched images were generated were obtained at the same time but using sensors operating in different wavebands (for instance the visible and infrared), thereby in this example the enhanced digital image may contain multi-sensor information about the physical object or environment. Other embodiments of the invention may use at least two digital images of a physical object or environment collected, at differing times and wherein the aforementioned differences include at least one change in the physical object or environment, such that once an optimum value of image similarity has been obtained, the respective image transformation is applied to (typically just one of) the images and an image difference identification technique is used to generate an enhanced digital image wherein identified in the enhanced digital image are the location(s) of the aforementioned differences, so as to provide a detection of the at least one change in the physical object or environment. The image difference identification technique may be an algorithm implemented within a computer system that may output the locations of the differences into a memory location within the computer system, and these locations are preferably then displayed to a user via a user interface, preferably overlaid over at least one of the digital images (whether transformed or not) so as to show the locations in the image(s) to the user.

Change detection has many uses. For example on a macroscopic level when applied to a landscape, coastal erosion, glacial retreat or urbanisation can be detected and ultimately quantified. Applications also exist in quality control, intrusion detection, medical imaging and where images taken in different wavebands are fused. On a microscopic level bacteria growth may be detected and monitored. Another use of change detection is in television (TV) standards conversion. When TV programs produced in one nation are to be viewed in another, the TV standard may be different. A common example is converting between NTSC and PAL standards. Different standards may comprise different numbers of pixels and different frame rates making imagery conversion a complex technical problem. The ability to detect changes between the two images is substantially dependent on the accuracy with which any misalignment or distortion between the images can be determined, and with which the images can be subsequently matched.

BRIEF DESCRIPTION OF THE DRAWINGS

A preferred embodiment of the invention will now be described by way of example only and with reference to the accompanying drawings, in which.

DETAILED DESCRIPTION

Figure 1A:
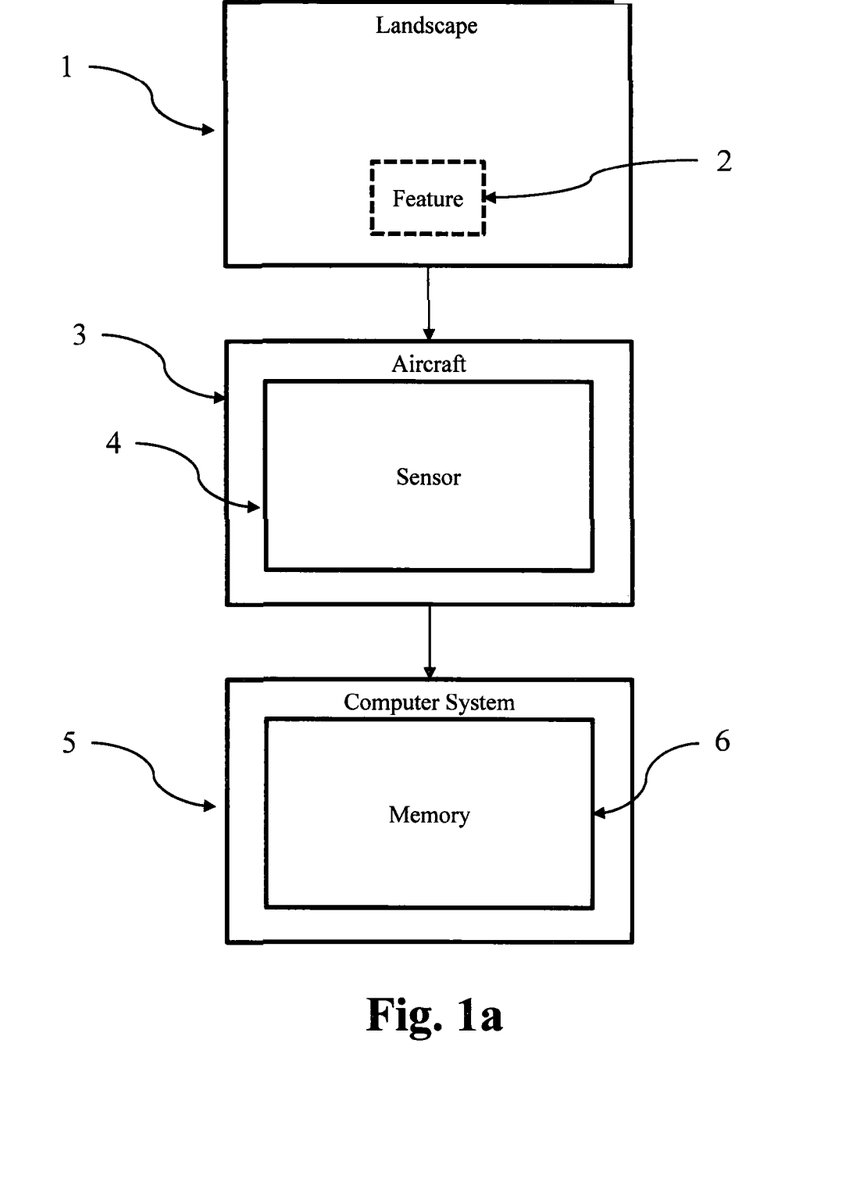
FIG. 1a shows a flow diagram of an embodiment of the invention.

FIG. 1a shows, in flow diagram form, an embodiment of the invention. A sensor 4 comprising a photographic digital camera is mounted on an aircraft 3 pointing substantially downwards, such that the camera may image the ground. The camera features associated on-board memory. The aircraft 3 flies substantially overhead of a landscape 1 and the sensor 4 obtains a first digital image of the landscape 1. At a later date the landscape 1 has changed to include additional feature 2. Furthermore the illumination conditions are different on the later date. The aircraft 3 flies substantially overhead of the landscape 1 (now including feature 2) but does not follow the same flight route as the prior overflight. The sensor 4 obtains a second digital image of the landscape 1. Both first and second digital images are provided into a computer, system 5 as digital input images. The images are stored in memory 6 inside the computer system 5. The two digital input images are such that they are offset and rotated relative to each other (owing to the different flight routes) and feature substantial differences (owing to the different illumination conditions and the additional feature 2). Inside the computer system 5 the method described herein is executed to determine an optimum image transformation to match the two digital input images. The optimum image transformation is applied to the second digital input image so as to generate an enhanced digital image. Inside the computer system 5 a change identification technique is applied to the first digital input image and the enhanced digital image so as to identify feature 2.

Figure 1B:
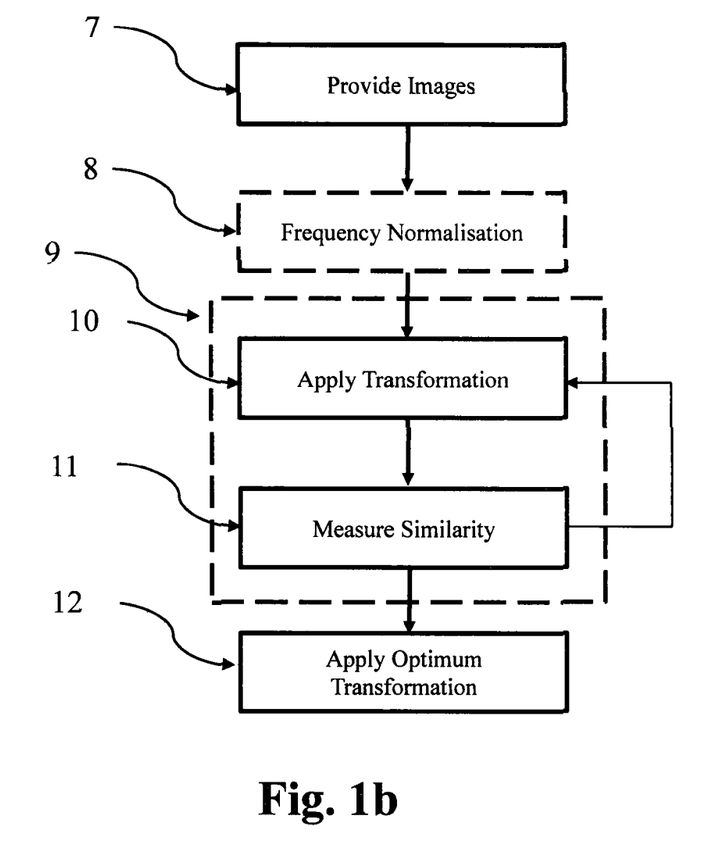
FIG. 1b shows a flow diagram providing an overview of the image enhancement steps in an embodiment of the invention.

FIG. 1b shows, in flow diagram form, an overview of the image enhancement steps in an embodiment of the invention. Steps that may represent multiple steps are highlighted in the Figure using broken lines. The image processing steps may occur inside the computer system shown in FIG. 1a. First and second digital input images of a physical environment or object are provided 7 upon which frequency normalisation 8 is performed, so as to generate first and second respective frequency normalised digital images. A group of iterative steps 9 are then applied to the frequency normalised digital images. The iterative steps or optional parallel processing comprises applying an image transformation 10 to the second frequency normalised digital image and obtaining a measure of image similarity 11. An optimum value for the measure of image similarity is used to determine the optimum image transformation 12 which is applied to, the second digital input image so as to generate an enhanced digital image.

Figure 1C:
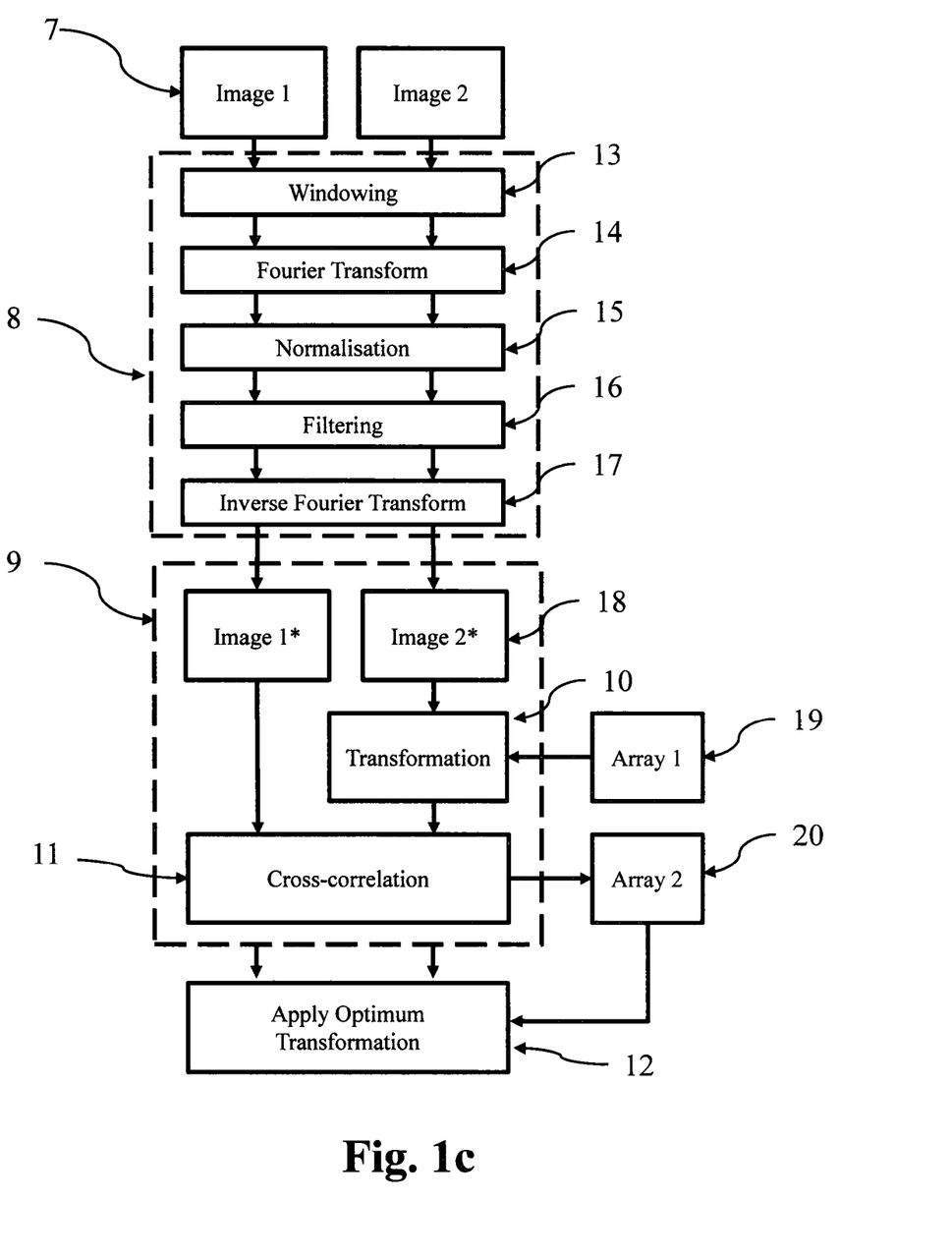
FIG. 1c shows a flow diagram providing a detailed view of the image enhancement steps in an embodiment of the invention.

FIG. 1c shows, in flow diagram form, a detailed view of the image enhancement steps in an embodiment of the invention also shown in FIG. 1b. Steps that may represent multiple steps are highlighted in the Figure using broken lines. There are first and second digital input images 7 provided in accordance with the method. A Tukey windowing function 13 is applied to each digital input image prior to performing a frequency normalisation 8. The frequency normalised versions of each digital input image are created by applying a Fourier Transform 14 so as to create phase space representations of the digital input images. Each phase space representation comprises an array of complex values. Each complex value in each array is normalised 15. A Butterworth filter 16 is applied to each of the normalised phase space distributions so as to generate filtered normalised phase space distributions. An inverse Fourier Transform 17 function is then applied to each filtered normalised phase space representation so as to create the first and second respective frequency normalised digital images 18. An image transformation 10 is applied to the second frequency normalised digital image, the image transformation is a rotation defined by one parameter in an array 19 in the computer system. Similarity between the rotated second frequency normalised digital image and the first frequency normalised digital image is measured by performing a cross-correlation 11 so as to obtain a correlation score that is stored as one value in an array 20 stored within the computer system. The steps 9 are repeated for each rotation specified in the parameter array 19. Following all rotations specified in the parameter array 19, an optimum image transformation 12 is applied to the second digital input image (wherein the optimum image transformation corresponds to the image transformation that yielded the maximum correlation score from the array of values 20) so as to generate an enhanced digital image.

Figure 2A:
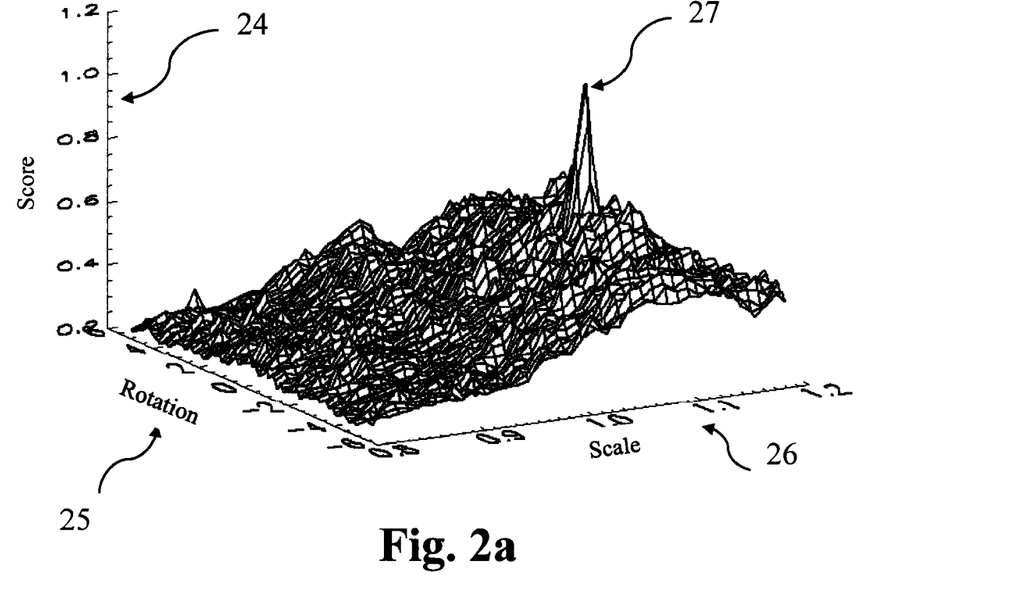
FIG. 2a shows a graph of correlation score against rotation and scale values according to an embodiment of the invention.
Figure 2B:
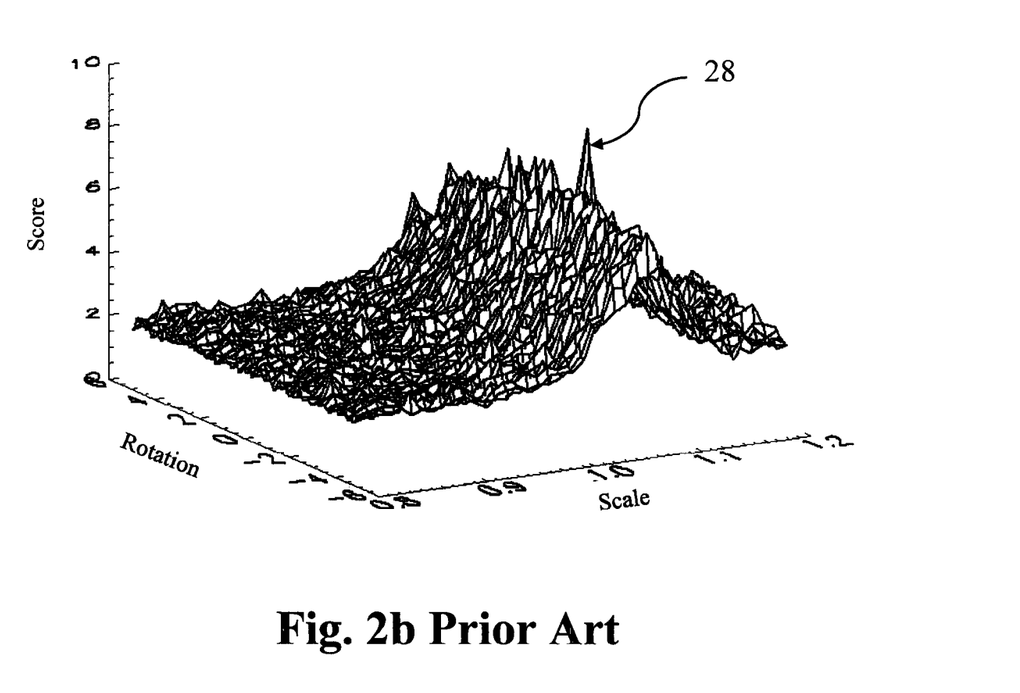
FIG. 2b shows a graph of the correlation score against rotation and scale values as a result of applying a conventional correlation approach.

FIG. 2a and FIG. 2b show the correlation score 24 against rotation 25 and scale 26 for an embodiment of the invention and for a conventional iterative phase-correlation method, respectively. The correlation methods have been applied to two greyscale images of the same physical environment imaged from substantially overhead, the two images having substantial differences including relative amounts of noise, illumination angle, rotation (−0.4 degrees), scaling (1.11) and translation (17 pixels horizontally and 10 pixels vertically). FIG. 2a shows that the new method results in correlation peaks that increase comparatively smoothly to a clearly defined peak 27 at the substantial true value of rotation and scale whereas FIG. 2b shows how a standard phase-correlation method results in a noisy plot with a poorly defined peak 28 that is difficult to distinguish reliably.

The invention claimed is:

1. A method of generating an enhanced digital image of a physical object or environment, the method comprising the steps of:
providing first and second images of a physical object or environment as digital input images, the first and second digital input images exhibiting differences other than or in excess of differences in projection;
applying a plurality of image transformations to at least one of the digital input images, and for each image transformation applying an image comparison operation to determine a measure of image similarity;

determining an optimum image transformation corresponding to an optimum value for the measure of image similarity; and applying the optimum image transformation to the at least one of the digital input images so as to generate at least one enhanced digital image that is substantially matched to the other digital input image;

wherein the step of applying a plurality of image transformations and determining in each case a measure of image similarity, comprises:

converting both digital input images to frequency normalised digital images; and applying the plurality of image transformations to at least one of the frequency normalised digital images, and for each of the plurality of image transformations:

applying the image comparison operation to the frequency normalised digital images and generating the measure of image similarity therefrom.

2. A method according to claim 1 wherein within the step of applying a plurality of image transformations, the image comparison operation is a cross-correlation.

3. A method according to claim 2 wherein the measure of image similarity is a correlation score.

4. A method according to claim 2 wherein the maximum score from a plurality of correlation scores is taken as the optimum value of a measure of image similarity.

5. A method according to claim 1 wherein each image transformation used within the step of applying a plurality of image transformations is defined by at least one pre-set parameter stored in a computer system.

6. A method according to claim 1 wherein the step of applying a plurality of image transformations includes applying a windowing function to at least one of the digital images.

7. A method according to claim 6 wherein the windowing function is a Tukey window.

8. A method according to claim 1 wherein the step of applying a plurality of image transformations includes applying a frequency filter to at least one of the digital images.

9. A method according to claim 8 wherein the frequency filter is a Butterworth filter.

10. A method according to claim 1 wherein the step of applying the optimum image transformation to the at least one of the digital input images, comprises the additional step of:

Combining the at least two digital images, so as to generate an enhanced digital image comprising information from each of the first and second digital input images.

11. A method according to claim 1 wherein the first and second input images are images of a physical object or environment collected at differing times and wherein the aforementioned differences include at least one change in the physical object or environment, and the step of applying the optimum image transformation to the at least one of the digital input images, comprises the additional step of:

Applying image difference identification to at least two digital images so as to generate an enhanced digital image, wherein identified in the enhanced digital image are the location(s) of the aforementioned differences, so as to provide a detection of the at least one change in the physical object or environment.

12. A method according to claim 1, wherein the first and second digital input images are of a terrain.

13. A method according to claim 12 wherein the first digital input image is an orthorectified terrain image, the second digital input image is a non-orthorectified terrain image, and in the step of applying the optimum image transformation, the optimum image transformation is applied to the second digital input image to provide it as an orthorectified digital image.

14. A method according to claim 1 further comprising the initial step of:

Recording the first and second digital input images using at least one sensor.

15. Apparatus of generating an enhanced digital image of a physical object or environment, wherein the apparatus comprises at least one computer configured to:

provide first and second images of a physical object or environment as digital input images, the first and second digital input images exhibiting differences other than or in excess of differences in projection;

apply a plurality of image transformations to at least one of the digital input images, and for each image transformation apply an image comparison operation to determine a measure of image similarity;

determine an optimum image transformation corresponding to an optimum value for the measure of image similarity; and apply the optimum image transformation to the at least one of the digital input images so as to generate at least one enhanced digital image that is substantially matched to the other digital input image;

characterised in that the at least one computer is configured, in applying a plurality of image transformations and determining in each case a measure of image similarity, to:

convert both digital input images to frequency normalised digital images; and apply the plurality of image transformations to at least one of the frequency normalised digital images, and for each of the plurality of image transformations, to:

apply the image comparison operation to the frequency normalised digital images and generate the measure of image similarity therefrom.

* * * * *